(12) United States Patent
Dai et al.

(10) Patent No.: US 8,085,918 B2
(45) Date of Patent: Dec. 27, 2011

(54) COMMUNICATION TERMINAL AND METHOD FOR ANSWERING INCOMING CALL

(75) Inventors: Lung Dai, Taipei Hsien (TW); Rong-Xiao Fang, Shenzhen (CN)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 249 days.

(21) Appl. No.: 12/642,873

(22) Filed: Dec. 21, 2009

(65) Prior Publication Data

US 2011/0103563 A1 May 5, 2011

(30) Foreign Application Priority Data

Oct. 30, 2009 (CN) .......................... 2009 1 0309079

(51) Int. Cl.
*H04M 3/42* (2006.01)
(52) U.S. Cl. ............. 379/201.1; 379/207.02; 455/456.1; 455/556.1; 455/566
(58) Field of Classification Search ............... 379/201.1, 379/207.02; 455/456.1, 556.1, 566
See application file for complete search history.

(56) References Cited

U.S. PATENT DOCUMENTS

| | | | | |
|---|---|---|---|---|
| 7,010,098 B2 * | 3/2006 | Moquin et al. | ............... | 379/56.1 |
| 7,263,373 B2 * | 8/2007 | Mattisson | ................... | 455/456.3 |
| 7,319,889 B2 * | 1/2008 | Goris et al. | .................... | 455/574 |
| 7,460,881 B2 * | 12/2008 | Cho | .......................... | 455/550.1 |
| 7,633,049 B1 * | 12/2009 | Huang et al. | ................... | 250/221 |
| 7,764,782 B1 * | 7/2010 | Coughlan et al. | ......... | 379/373.01 |
| 7,929,946 B2 * | 4/2011 | Rathus et al. | .................. | 455/411 |
| 7,957,762 B2 * | 6/2011 | Herz et al. | .................. | 455/550.1 |
| 8,000,736 B2 * | 8/2011 | Forstall et al. | ............. | 455/550.1 |
| 8,014,763 B2 * | 9/2011 | Hymes | ........................ | 455/414.2 |
| 8,036,699 B2 * | 10/2011 | Araki | .......................... | 455/550.1 |

* cited by examiner

*Primary Examiner* — Simon Sing
(74) *Attorney, Agent, or Firm* — Altis Law Group, Inc.

(57) ABSTRACT

A communication terminal includes an alerting unit, a capturing unit, an identifying unit and a phone answering unit. The alerting unit is configured for generating an alert signal when the communication terminal has an incoming call. The capturing unit is configured for capturing consecutive images according to the alert signal from the alerting unit. The identifying unit is configured for identifying the captured consecutive images from the capturing unit, and determining whether the last captured image shows an image of an ear. The phone answering unit is configured for answering the incoming call according to a determination result of the identifying unit that the last captured image shows the image of the ear.

16 Claims, 4 Drawing Sheets

COMMUNICATION TERMINAL AND METHOD FOR ANSWERING INCOMING CALL

BACKGROUND

1. Technical Field

The present disclosure relates to communication terminals, and more particularly to a communication terminal for conveniently answering an incoming call.

2. Description of Related Art

Making a phone call is a basic functionality of mobile phones. Generally, mobile phones provide one or more modes for answering incoming calls from others, such as by pressing keys, and by performing function modules. However, most incoming calls can only be answered by actuating a button/key.

Therefore, what is needed is a communication terminal for conveniently answering incoming call.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Figure 1:
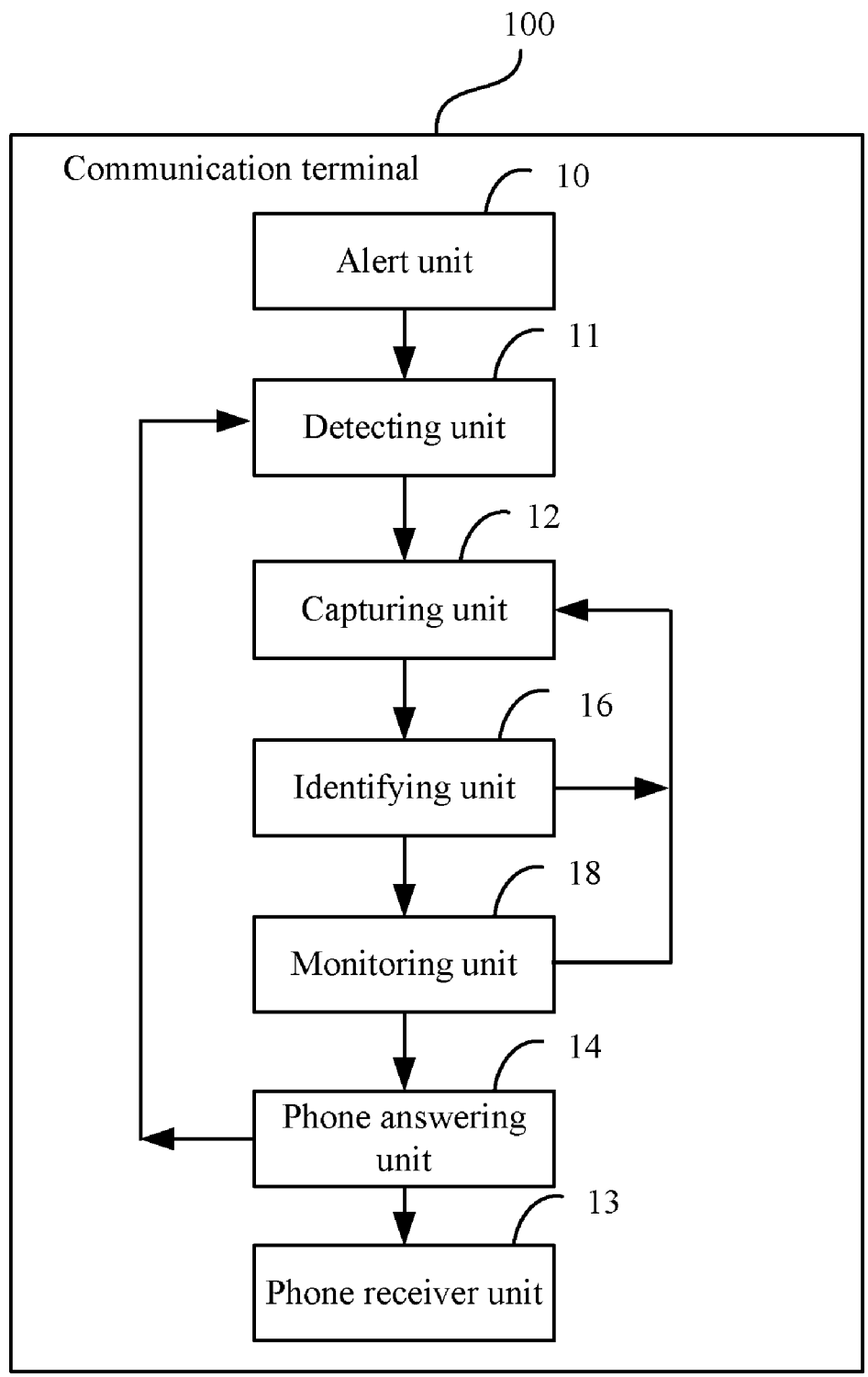
FIG. 1 is a functional block diagram of a communication terminal in accordance with an exemplary embodiment.

Referring to FIG. 1, a functional block diagram of a communication terminal 100 is shown according to an exemplary embodiment. The communication terminal 100 includes an alerting unit 10, a detecting unit 11, a capturing unit 12, a phone receiver unit 13, a phone answering unit 14, an identifying unit 16, and a condition monitoring unit 18. In the embodiment, the communication terminal 100 is a mobile phone. In other embodiment, the communication terminal 100 may be personal digital assistant (PDA) configured with mobile communication functionality.

The alerting unit 10 is configured for generating an alert signal when the communication terminal 100 has an incoming call. The alert signal can be audio or physical such as a beep or the terminal will vibrate. In the embodiment, the alerting unit 10 is a speaker.

Figure 2:
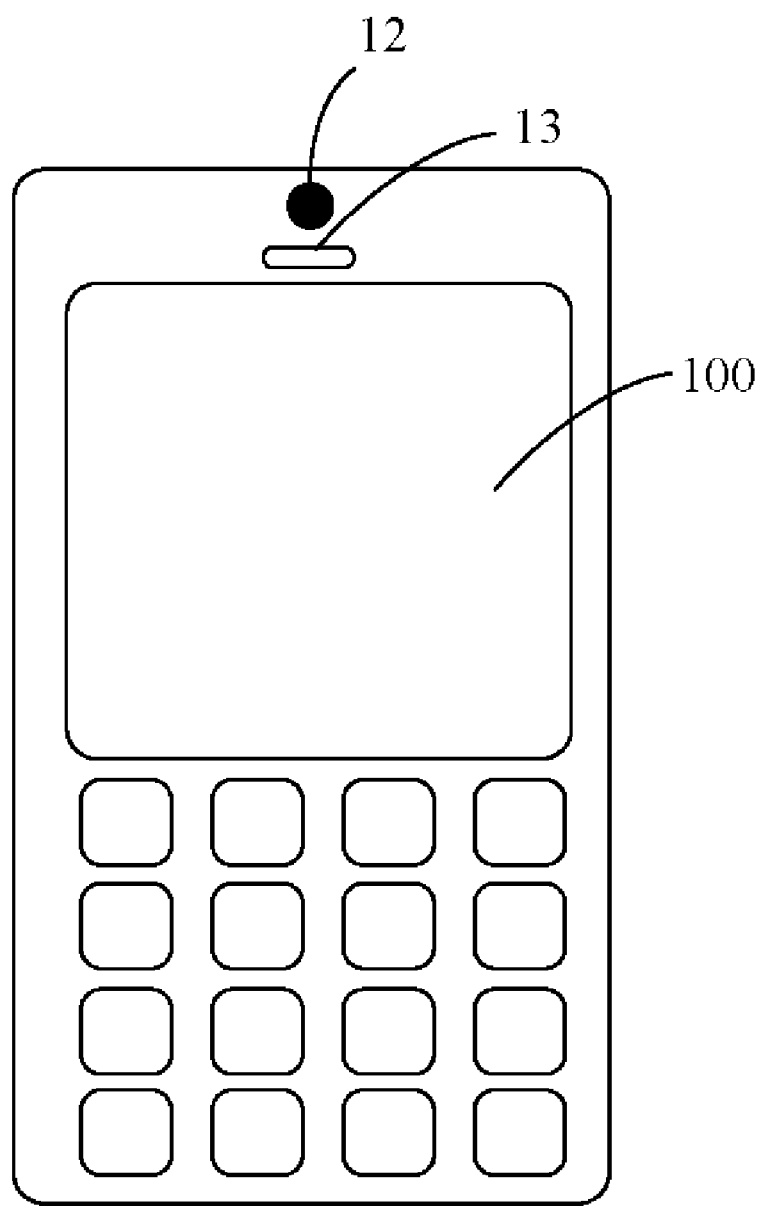
FIG. 2 is a front structural view of the communication terminal of FIG. 1.

The capturing unit 12 is configured for capturing consecutive images according to the alert signal from the alerting unit 10. The phone receiver unit 13 is configured for listening to voice of the caller when the incoming call is answered. In the embodiment, the capturing unit 12 and the phone receiver unit 13 are positioned on a same side of the communication terminal 100 (shown in FIG. 2). The capturing unit 12 is adjacent to the phone receiver unit 13. The capturing unit 12 can be a camera module that is installed in a front surface of the communication terminal 100. The capturing unit 12 is specially programmed to operate in response to a determination that an incoming call is received.

The detecting unit 11 is configured for detecting whether the incoming call is answered manually, such as the user pressing a key. If the detecting unit 11 detects that the incoming call is not being answered manually, the capturing unit 12 captures consecutive images. In other embodiments, the detecting unit 11 can be configured for detecting whether the incoming call was disconnected by the caller or the callee.

The identifying unit 16 is configured for identifying the consecutive captured images of the capturing unit 12 and determining whether the last captured image shows an image of an ear. If the last captured image does not show an image of an ear, the capturing unit 12 continues capturing consecutive images. In other embodiments, the detecting unit 11 is enabled again if it is determined that the last captured image is not showing an image of an ear.

If the last captured image shows an image of an ear, the condition monitoring unit 18 is configured for determining whether the image of the ear in the last captured image is substantially in the centre of the identified image. If the ear image is substantially in the centre of the identified image, this means that the user is holding the phone against his ear and the phone answering unit 14 is configured for answering the incoming call. If the image of the ear in the last captured image is substantially in the centre of the identified image, the capturing unit 12 continues capturing. In other embodiments, if the image of the ear in the last captured image is substantially in the centre of the identified image, the detecting unit 11 is enabled again.

As described above, in other embodiments, the condition monitoring unit 18 can be omitted. If the identifying unit 16 determines that the last captured image shows an image of an ear, the phone answering unit 14 answers the incoming call. The detecting unit 11 also can be omitted. If the alerting unit 10 alerts an incoming call, the capturing unit 12 captures consecutive images. The communication terminal 100 can conveniently answer an incoming call without any manual input.

Figure 3:
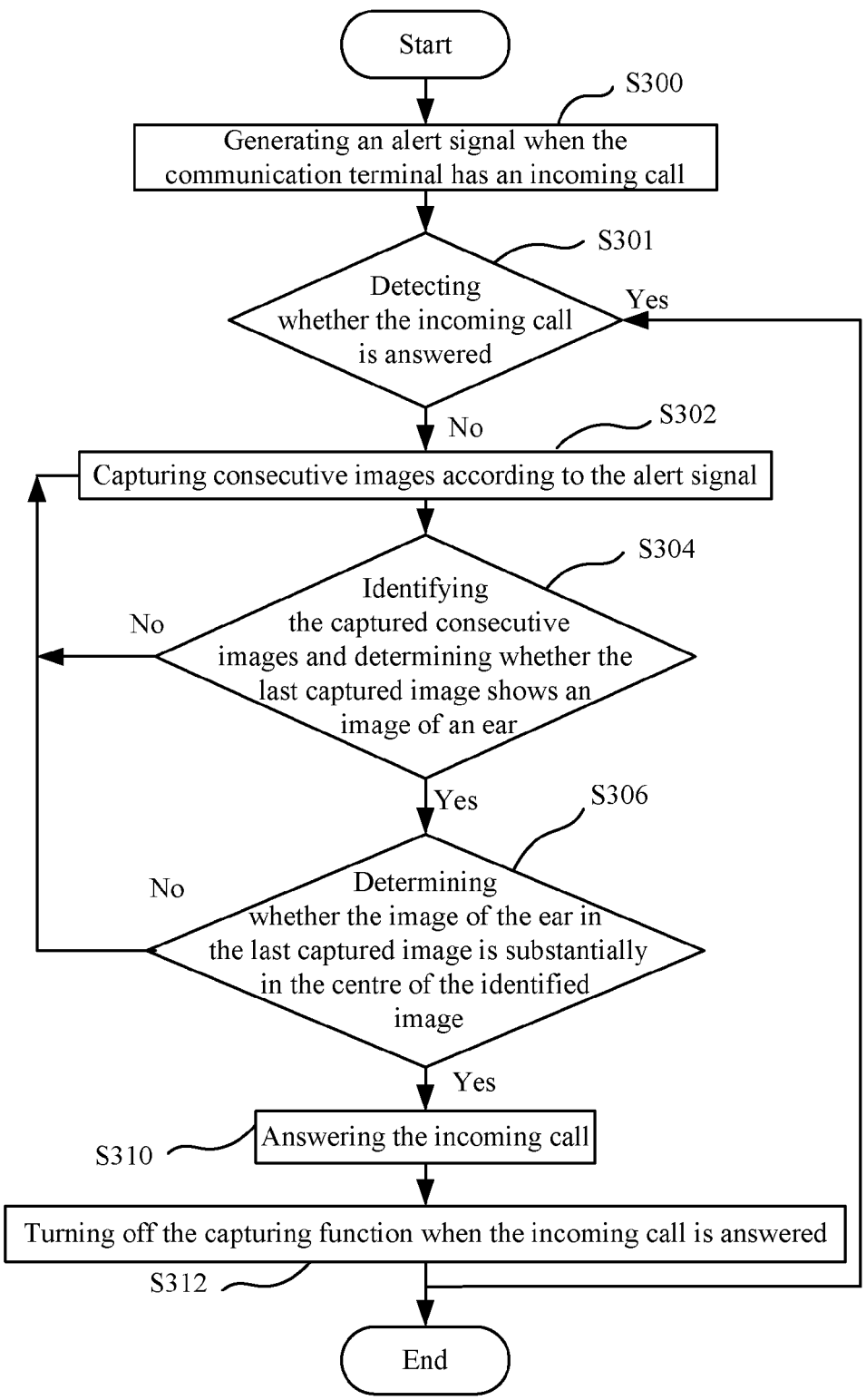
FIG. 3 is a flowchart of a method for answering an incoming call in accordance with an exemplary embodiment.

Further referring to FIG. 3, a flowchart of a method, for the communication terminal 100 answering an incoming call, in accordance with an exemplary embodiment is shown. The method shown includes the following steps.

Beginning in step S300, generating an alert signal when the communication terminal has an incoming call. The alert function is enabled by the alerting unit 10.

In step S301, detecting whether the incoming call is answered. If the incoming call is not answered, step S302 is implemented.

In step S302, capturing consecutive images according to the alert signal. The capturing function is enabled by the capturing unit 12 when the alerting unit 10 generates the alert signal.

In step S304, identifying the captured consecutive images and determining whether the last captured image shows an image of an ear. If the last captured image shows the image of the ear, step S306 is implemented. If the last captured image does not show the image of the ear, step S302 is implemented again. In other embodiments, if the last captured image does not show the image of the ear, step S301 is implemented again.

In step S306, determining whether the image of the ear in the last captured image is substantially in the centre of the identified image. If the image of the ear in the last captured image is substantially in the centre of the identified image, step S310 is implemented. If the image of the ear in the last captured image is not substantially in the centre of the identified image, step S302 is implemented again. In other embodiments, if the image of the ear in the last captured image is not substantially in the centre of the identified image, step S301 is implemented again.

In step S310, answering the incoming call.

In step S312, turning off the capturing function when the incoming call is answered.

Figure 4:
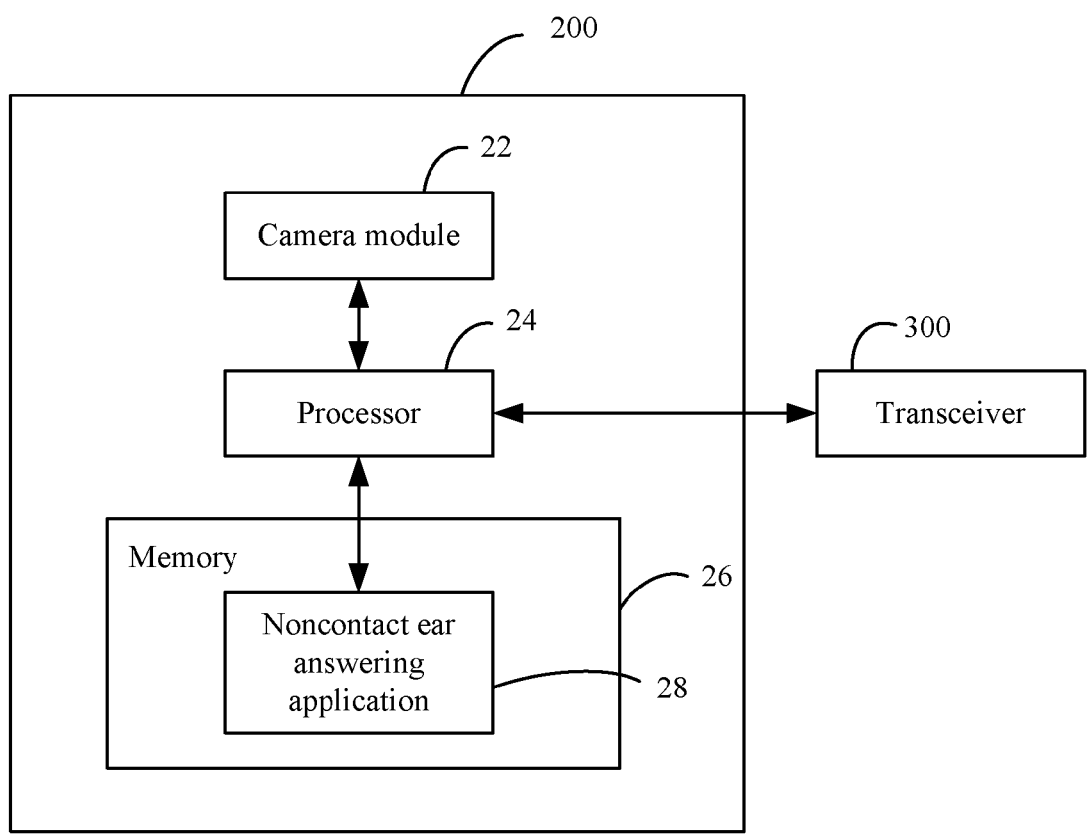
FIG. 4 is a functional block diagram of a communication terminal in accordance with another exemplary embodiment.

Referring to FIG. 4, a functional block diagram of a communication terminal 200 is shown according to another exemplary embodiment. The communication terminal 200 includes a camera module 22, a processor 24, and a memory 26. The communication terminal 200 is configured for receiving/sending information from/to another communication terminal (not shown) via a transceiver 300. In this embodiment, the transceiver 300 includes an antenna.

The processor 24 is operatively coupled to the camera module 22 and the memory 26. A noncontact ear answering application 28 is stored in the memory 26 and is configured for execution by the processor 24. The noncontact ear-answering application 28 includes the following instructions: first, monitor by the processor 24 in real time whether an incoming call is received from another communication terminal; second, initiate the camera module 22 to capture consecutive images by the processor 24 that the incoming call is being received from the another communication terminal; third, analyze the consecutive captured images by the processor 24 to identify whether the last captured image shows an image of an ear according to a predetermined recognition algorithm; fourth, answer the incoming call by the processor 24 upon an analyzing result that the last captured image shows an image of an ear, so as to allow a communication to be performed between the communication terminal 200 and the another communication terminal; fifth, disable the camera module 22 when the incoming call from the another terminal is determined by the processor 24 being answered by the communication terminal 200.

The communication terminal 200 is similar to the communication 100 as described above.

It is to be understood, however, that even though numerous characteristics and advantages have been described with reference to particular embodiments, the present invention is not limited to the particular embodiments described and exemplified, and the embodiments are capable of considerable variation and modification without departure from the scope and spirit of the appended claims.

What is claimed is:

1. A communication terminal, comprising:
    an alerting unit configured for generating an alert signal when the communication terminal has an incoming call;
    a capturing unit configured for capturing consecutive images according to the alert signal from the alerting unit;
    an identifying unit configured for identifying the captured consecutive images from the capturing unit, and determining whether the last captured image shows an image of an ear; and
    a phone answering unit configured for answering the incoming call according to a determination result of the identifying unit that the last captured image shows the image of the ear.

2. The communication terminal of claim 1, further comprising a detecting unit configured for detecting whether the incoming call is answered, wherein when the incoming call is not answered, the capturing unit captures consecutive images.

3. The communication terminal of claim 1, further comprising a condition monitoring unit configured for determining whether the image of the ear in the last captured image is substantially in the centre of the identified image, wherein when the image of the ear in the last captured image is substantially in the centre of the identified image, the phone answering unit answers the incoming call.

4. The communication terminal of claim 3, wherein when the image of the ear in the last captured image is substantially in the centre of the identified image, the capturing unit is further configured to continue capturing consecutive images.

5. The communication terminal of claim 1, wherein when the last captured image does not show an image of an ear, the capturing unit is further configured to continue capturing consecutive images.

6. The communication terminal of claim 1, further comprising a phone receiver unit, the capturing unit and the phone receiver unit being located on a same side of the communication terminal.

7. A method for a communication terminal answering an incoming call, the method comprising:
    generating an alert signal when the communication terminal has an incoming call;
    capturing consecutive images according to the alert signal;
    identifying the consecutive captured images, and determining whether the last captured image shows an image of an ear; and
    answering the incoming call when the last captured image shows the image of the ear.

8. The method of claim 7, further comprising:
    when the last captured image does not show the image of the ear, continuing capturing consecutive images.

9. The method of claim 7, further comprising:
    detecting whether the incoming call is answered; and
    when the incoming call is not answered, capturing consecutive images according to the alert signal.

10. The method of claim 9, further comprising:
    when the last captured image does not show the image of the ear, detecting whether the incoming call is answered.

11. The method of claim 7, further comprising:
    determining whether the image of the ear in the last captured image is substantially in the centre of the identified image; and
    when the image of the ear in the last captured image is substantially in the centre of the identified image, answering the incoming call.

12. The method of claim 11, further comprising:
    when the image of the ear in the last captured image is not substantially in the centre of the identified image, continuing capturing consecutive images.

13. The method of claim 7, further comprising:
    when the last captured image does not show the image of the ear, detecting whether the incoming call is answered; and
    when the incoming call is not answered, continuing capturing consecutive images.

14. The method of claim 7, further comprising turning off the capturing function when the incoming call is answered.

15. A communication terminal capable of answering an incoming call, the communication terminal comprising:
    a camera module;
    a memory;
    a processor operatively coupled to the camera module and the memory; and
    a noncontact ear-answering application stored in the memory and configured for execution by the processor, the noncontact ear-answering application comprising instructions to:
        monitor by the processor in real time whether an incoming call is received from another communication terminal;

initiate the camera module to capture consecutive images by the processor that the incoming call is being received from the another communication terminal;

analyze the consecutive captured images by the processor to identify whether the last captured image shows an image of an ear according to a predetermined recognition algorithm; and answer the incoming call by the processor upon an analyzing result that the last captured image shows the image of the ear, so as to allow a communication to be performed between the communication terminal and the another communication terminal.

16. The communication terminal of claim 15, wherein the noncontact ear-answering application comprises instructions to disable the camera module when the incoming call from the another terminal is determined by the processor being answered by the communication terminal.

* * * * *